US011070665B2

(12) United States Patent
Ma et al.

(10) Patent No.: US 11,070,665 B2
(45) Date of Patent: Jul. 20, 2021

(54) VOICE OVER INTERNET PROTOCOL PROCESSING METHOD AND RELATED NETWORK DEVICE

(71) Applicant: HUAWEI TECHNOLOGIES CO., LTD., Guangdong (CN)

(72) Inventors: Erli Ma, Xi'an (CN); Wentao Lan, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/549,527

(22) Filed: Aug. 23, 2019

(65) Prior Publication Data

US 2019/0379785 A1 Dec. 12, 2019

Related U.S. Application Data

(63) Continuation of application No. PCT/CN2017/074773, filed on Feb. 24, 2017.

(51) Int. Cl.
*H04M 3/14* (2006.01)
*G06F 21/31* (2013.01)
*H04M 7/00* (2006.01)

(52) U.S. Cl.
CPC .............. *H04M 3/14* (2013.01); *G06F 21/31* (2013.01); *H04M 7/0078* (2013.01); *H04M 7/0084* (2013.01); *H04M 7/0087* (2013.01)

(58) Field of Classification Search
CPC .... H04M 3/14; H04M 7/0078; H04M 7/0084; H04M 7/0087; G06F 21/31; H04W 88/18; H04N 21/4316

(Continued)

(56) References Cited

U.S. PATENT DOCUMENTS 7,411,984 B1* 8/2008 Moth .................. H04L 12/66
370/525
2002/0077065 A1* 6/2002 Tamura ............... H04W 88/181
455/72

(Continued)

FOREIGN PATENT DOCUMENTS

CN 101005382 A 7/2007
CN 101237625 A 8/2008

(Continued)

OTHER PUBLICATIONS

Dean Willis: "Re: [Sip] Of-hook and On-hook @sip?", IETF Mail Archive, Feb. 26, 2003, XP055646497, pp. 1-2.

(Continued)

*Primary Examiner* — Md S Elahee
(74) *Attorney, Agent, or Firm* — Womble Bond Dickinson (US) LLP

(57) ABSTRACT

A voice over Internet protocol processing method and a related network device are disclosed. The method includes: detecting, by a calling access network element, an off-hook event; encapsulating, by the calling access network element, the off-hook event into first signaling; sending, by the calling access network element, the first signaling to a cloud server; receiving, by the calling access network element, second signaling sent by the cloud server, where the second signaling is used to establish a first transmission path between the calling access network element and the cloud server, and the first transmission path is used to transmit data between the calling access network element and the cloud server; and establishing, by the calling access network element, the first transmission path based on the second signaling. Overall efficiency of the voice over Internet protocol system can be improved, and the construction costs can be lowered.

20 Claims, 4 Drawing Sheets

(58) Field of Classification Search
USPC .......................................... 379/377; 370/525
See application file for complete search history.

(56) References Cited

U.S. PATENT DOCUMENTS

| | | | | |
|---|---|---|---|---|
| 2002/0129374 | A1* | 9/2002 | Freeman ............ | H04N 21/4316 725/91 |
| 2005/0123126 | A1* | 6/2005 | Gandhi ............... | H04M 7/0015 379/377 |
| 2007/0047719 | A1 | 3/2007 | Dhawan et al. | |
| 2010/0290453 | A1 | 11/2010 | Rist et al. | |
| 2014/0321417 | A1 | 10/2014 | Yang et al. | |

FOREIGN PATENT DOCUMENTS

| | | |
|---|---|---|
| CN | 102271137 A | 12/2011 |
| CN | 102299962 A | 12/2011 |
| CN | 102843784 A | 12/2012 |
| CN | 103166914 A | 6/2013 |
| EP | 1521439 A1 | 4/2005 |
| EP | 2640048 A1 | 9/2013 |

OTHER PUBLICATIONS

J. Rosenberg et al, An INVITE Inititiated Dialog Event Package for the Session Initiation Protocol (SIP);draft-ietf-sipping-dialog-package-06.txt, vol. sipping, No. 6, Apr. 12, 2005, XP015039019, 39 pages.
ITU-T H.248 Sub-series Implementors' Guide. Series H: Audiovisual and Multimedia Systems Infrastructure of audiovisual services—Communication procedures. Implementors' Guide for the H.248 Sub-series of Recommendations ("Media Gateway Control Protocol"). May 2, 2008, 59 pages.
ITU-T G.729 Implementers Guide. Series G: Transmission Systems and Media, Digital Systems and Networks Digital terminal equipment—Coding of voice and audio signals. Implementers guide for ITU-T Rec. G.729 (2012) Coding of speech at 8 kbit/s using conjugate-structure algebraic-code-excited linear prediction (CS-ACELP). Oct. 27, 2017, 9 pages.
"ITU-T G.711 Amendment 2, Series G: Transmission Systems and Media, Digital Systems and Networks Digital terminal equipments—Coding of voice and audiosignals. Pulse code modulation (PCM) of voice frequencies, Amendment 2: New Appendix III—Audio quality enhancement toolbox. Nov. 2009, 16 pages".
"ITU-T G.723.1, Series G: Transmission Systems and Media, Digital Systems and Networks Digital terminal equipments—Coding of analogue signals by methods other than PCM. Dual rate speech coder for multimedia communications transmitting at 5.3 and6.3 kbit/s. May 2006, 64 pages".
"ITU-T G.726 Corrigendum 1, Series G: Transmission Systems and Media, Digital Systems and Networks, Digital terminal equipments—Coding of analogue signalsby methods other than PCM, 40, 32, 24, 16 kbit/s Adaptive Differential Pulse Code Modulation (ADPCM), Corrigendum 1: Correction to Annex A: Extensions of Recommendation G.726 for use with uniform-quantized input and output. May 2005, 8 pages".
ITU-T G.722 Amendment 1. Series G: Transmission Systems and Media, Digital Systems and Networks, Digital terminal equipments C Coding of voice and audio signals, 7 kHz audio-coding within 64 kbit/s, Amendment 1: New Annex E C An alternative implementation of stereo super-wideband extension using floating point. Oct. 2014, 8 pages.

\* cited by examiner

VOICE OVER INTERNET PROTOCOL PROCESSING METHOD AND RELATED NETWORK DEVICE

CROSS-REFERENCE TO RELATED APPLICATIONS

The present disclosure is a continuation of International Patent Application No. PCT/CN2017/074773, filed on Feb. 24, 2017, the disclosure of which is hereby incorporated by reference in its entirety.

TECHNICAL FIELD

The present disclosure relates to voice over Internet protocol communications technologies based on cloud computing technologies, and in particular, to a voice over Internet protocol processing method and a related network device.

BACKGROUND

A current voice over Internet protocol (VoIP) construction mode emphasizes access network intelligence and requires an access network element to provide a signaling terminating capability and a media encoding/decoding capability. At a signaling level, common protocols that an access network element needs to support include: media gateway control protocol (MGCP), International Telecommunication Union H.248 media gateway control protocol (ITU-T H.248, H.248), session initiation protocol (SIP), and the like. In terms of media, common encoding/decoding standards that need to be supported include: G.711, G.729, G.723, G.726, G.722, AMR-WB, iLBC, T.38, and the like.

The access network element not only needs to process complex signaling, particularly introduced SIP signaling, but also needs to reserve a sufficient computing capability, to complete parsing and encapsulation of a SIP protocol and to negotiate and obtain a corresponding service capability, a corresponding right, and corresponding data. Therefore, this process usually requires the access network and a core network to complete a process in which a plurality of pieces of signaling are exchanged, and has a large computing amount and is relatively time-consuming. However, in terms of media encoding/decoding processing, the access network is also often required to reserve a large computing capability. A common approach is using a dedicated voice digital signal processor (DSP) chip or dedicating one core in a multi-core central processing unit (CPU) for encoding/decoding. Either a dedicated DSP or an independent CPU core that is configured to implement a voice media encoding/decoding function, forms a main part of hardware costs of the access network. In a VoIP network construction process, basic structures for the signaling and voice media processing are indispensable for VoIP implementation.

Therefore, in the VoIP network construction process, in addition to CPU and DSP resources, corresponding supporting resources, such as a memory and a flash, also need to be provided, and all of the resources are actually a part of enormous costs of network construction. In the VoIP network construction process, a large quantity of computing resources are allocated for a high computing capability is deposited in an access network element, resulting in high construction costs. In addition, because a voice service is sensitive to both a delay and a packet loss, resources reserved in a current access network element for a voice service are not shared with another service, to avoid that there are no sufficient resources when the resources are needed by the voice service. However, an average service volume of the voice service in each network element is extremely small while a large quantity of computing resources are deposited in the access network element. Consequently, network efficiency thereof is low.

SUMMARY

Embodiments of the present disclosure provide a voice over Internet protocol processing method, for improving overall efficiency of a voice over Internet protocol system and lowering construction costs.

A first aspect of the embodiments of the present disclosure provides a voice over Internet protocol processing method, including: detecting, by a calling access network element through a subscriber line interface circuit, off-hook of a first phone set connected to the calling access network element; encapsulating, by the calling access network element, the off-hook event into first signaling; sending, by the calling access network element, the first signaling to a cloud server, to enable the cloud server to create session management and media management based on the first signaling; receiving, by the calling access network element, second signaling sent by the cloud server, to enable the cloud server to establish a first transmission path between the calling access network element and the cloud server based on the second signaling, where the first transmission path is used to transmit data between the calling access network element and the cloud server; and establishing, by the calling access network element, the first transmission path based on the second signaling. In this embodiment of the present disclosure, a dynamic service capability is provided for voice over Internet protocol by using resources of a cloud server, thereby simplifying a processing capability of an access network element and lowering construction costs.

In one embodiment, in a first implementation of the first aspect of the embodiments of the present disclosure, before the detecting, by a calling access network element, off-hook of a first phone set, the processing method further includes: when a device system starts, sending, by the calling access network element, an authentication request to the cloud server, where the request carries authentication information of the first phone set. Authentication is added in this embodiment of the present disclosure, thereby improving operations in this embodiment of the present disclosure.

In one embodiment, in a second implementation of the first aspect of the embodiments of the present disclosure, after the sending, by the calling access network element, the first signaling to a cloud server, and before the receiving, by the calling access network element, second signaling sent by the cloud server, the processing method further includes: receiving, by the calling access network element, a first response sent by the cloud server, where the first response is used to acknowledge that the cloud server has received the first signaling. A process of receiving the first response is added in this embodiment of the present disclosure, thereby improving implementability and integrity of this embodiment of the present disclosure.

In one embodiment, in a third implementation of the first aspect of the embodiments of the present disclosure, after the establishing, by the calling access network element, the first transmission path based on the second signaling, the processing method further includes: sending, by the calling access network element, a second response to the cloud server, where the second response is used to determine that the second signaling has been performed by the calling access network element. A process of sending the second response is added in this embodiment of the present disclosure, thereby improving implementability and integrity of this embodiment of the present disclosure.

A second aspect of the embodiments of the present disclosure provides a voice over Internet protocol processing method, including: receiving, by a cloud server, first signaling sent by a calling access network element, where the first signaling carries an off-hook event, and the off-hook event is off-hook of a first phone set; sending, by the cloud server, second signaling to the calling access network element, where the second signaling is used to establish a first transmission path between the calling access network element and the cloud server, and the first transmission path is used to transmit data between the calling access network element and the cloud server; and sending, by the cloud server, third signaling to a called access network element, where the third signaling is used to establish a second transmission path between the called access network element and the cloud server, and the second transmission path is used to transmit data between the called access network element and the cloud server. In this embodiment of the present disclosure, a dynamic service capability is provided for voice over Internet protocol by using resources of a cloud server, thereby optimizing configuration of network resources and improving overall efficiency of a network system.

In one embodiment, in a first implementation of the second aspect of the embodiments of the present disclosure, before the receiving, by a cloud server, first signaling sent by a calling access network element, the processing method further includes: determining, by the cloud server, that the calling access network element has been authenticated. Performing, by the cloud server, authentication on an access network element and a phone set is added in this embodiment of the present disclosure, thereby improving operations of the embodiments of the present disclosure.

In one embodiment, in a second implementation of the second aspect of the embodiments of the present disclosure, after the receiving, by a cloud server, first signaling sent by a calling access network element, and before the sending, by the cloud server, second signaling to the calling access network element, the processing method further includes: sending, by the cloud server, a first response to the calling access network element, where the first response is used to acknowledge that the cloud server has received the first signaling. A process of sending the first response is added to this embodiment of the present disclosure, thereby improving implementability and integrity of this embodiment of the present disclosure.

In one embodiment, in a third implementation of the second aspect of the embodiments of the present disclosure, after the sending, by the cloud server, second signaling to the calling access network element, and before the sending, by the cloud server, third signaling to a called access network element, the processing method further includes: receiving, by the cloud server, a second response sent by the calling access network element, where the second response is used to determine that the second signaling has been performed by the calling access network element. A process of receiving the second response is added in this embodiment of the present disclosure, thereby improving implementability and integrity of this embodiment of the present disclosure.

In one embodiment, in a fourth implementation of the second aspect of the embodiments of the present disclosure, after the sending, by the cloud server, third signaling to a called access network element, the processing method further includes: receiving, by the cloud server, a third response sent by the called access network element, where the third response is used to determine that the third signaling has been performed by the called access network element. A process of receiving the third response is added in this embodiment of the present disclosure, thereby improving implementability and integrity of this embodiment of the present disclosure.

In one embodiment, in a fifth implementation of the second aspect of the embodiments of the present disclosure, after the receiving, by a cloud server, first signaling sent by a calling access network element, and before the sending, by the cloud server, second signaling to the calling access network element, the processing method further includes: creating, by the cloud server, target session management and target media management based on the first signaling. A process of creating, by the cloud server, session management and media management based on the first signaling is added in this embodiment of the present disclosure, so that this embodiment of the present disclosure is more logical.

In one embodiment, in a sixth implementation of the second aspect of the embodiments of the present disclosure, the processing method further includes: releasing, by the cloud server, the target session management and the target media management when a voice call ends. A process of releasing, by the cloud server, computing resources when a session ends is added in this embodiment of the present disclosure, thereby improving operations of the embodiments of the present disclosure.

A third aspect of the embodiments of the present disclosure provides a voice over Internet protocol processing method, including: receiving, by a called access network element, third signaling sent by a cloud server, where the third signaling is used to establish a second transmission path between the called access network element and the cloud server, and the second transmission path is used to transmit data between the called access network element and the cloud server; and establishing, by the called access network element, the second transmission path based on the third signaling. In this embodiment of the present disclosure, a dynamic service capability is provided for voice over Internet protocol by using resources of a cloud server, thereby simplifying a processing capability of an access network element and lowering construction costs.

In one embodiment, in a first implementation of the third aspect of the embodiments of the present disclosure, after the establishing, by the called access network element, the second transmission path based on the third signaling, the processing method further includes: sending, by the called access network element, a third response to the cloud server, where the third response is used to determine that the third signaling has been performed by the called access network element. A process of sending the third response is added in this embodiment of the present disclosure, thereby improving implementability and integrity of this embodiment of the present disclosure.

A fourth aspect of the embodiments of the present disclosure provides a calling access network element, including: a detection unit, configured to detect an off-hook event, where the off-hook event is off-hook of a first phone set, and the first phone set is connected to the calling access network element; an encapsulation unit, configured to encapsulate the off-hook event into first signaling; a first sending unit, configured to send the first signaling to a cloud server, where the first signaling is used to create session management and media management by the cloud server; a first receiving unit, configured to receive second signaling sent by the cloud server, where the second signaling is used to establish a first transmission path between the calling access network element and the cloud server, and the first transmission path is used to transmit data between the calling access network element and the cloud server; and an establishment unit, configured to establish the first transmission path based on the second signaling. In this embodiment of the present disclosure, a dynamic service capability is provided for voice over Internet protocol by using resources of a cloud server, thereby simplifying a processing capability of an access network element and lowering construction costs.

In one embodiment, in a first implementation of the fourth aspect of the embodiments of the present disclosure, the calling access network element further includes: an authentication unit, configured to: when a device system starts, initiate authentication to the cloud server. Authentication is added in this embodiment of the present disclosure, thereby improving operations of the embodiments of the present disclosure.

In one embodiment, in a second implementation of the fourth aspect of the embodiments of the present disclosure, the calling access network element further includes: a second receiving unit, configured to receive a first response sent by the cloud server, where the first response is used to acknowledge that the cloud server has received the first signaling. A process of receiving the first response is added in this embodiment of the present disclosure, thereby improving implementability and integrity of this embodiment of the present disclosure.

In one embodiment, in a third implementation of the fourth aspect of the embodiments of the present disclosure, the calling access network element further includes: a second sending unit, configured to send a second response to the cloud server, where the second response is used to determine that the second signaling has been performed by the calling access network element. A process of sending the second response is added in this embodiment of the present disclosure, thereby improving implementability and integrity of this embodiment of the present disclosure.

A fifth aspect of the embodiments of the present disclosure provides a cloud server, including: a first receiving unit, configured to receive first signaling sent by a calling access network element, where the first signaling carries an off-hook event, and the off-hook event is off-hook of a first phone set; a first sending unit, configured to send second signaling to the calling access network element, where the second signaling is used to establish a first transmission path between the calling access network element and the cloud server, and the first transmission path is used to transmit data between the calling access network element and the cloud server; and a second sending unit, configured to send third signaling to a called access network element, where the third signaling is used to establish a second transmission path between the called access network element and the cloud server, and the second transmission path is used to transmit data between the called access network element and the cloud server. In this embodiment of the present disclosure, a dynamic service capability is provided for voice over Internet protocol by using resources of a cloud server, thereby optimizing configuration of network resources and improving overall efficiency of a network system.

In one embodiment, in a first implementation of the fifth aspect of the embodiments of the present disclosure, the cloud server further includes: a determining unit, configured to determine that the calling access network element has been authenticated. Performing, by the cloud server, authentication on an access network element and a phone set is added in this embodiment of the present disclosure, thereby improving operations of the embodiments of the present disclosure.

In one embodiment, in a second implementation of the fifth aspect of the embodiments of the present disclosure, the cloud server further includes: a third sending unit, configured to send a first response to the calling access network element, where the first response is used to acknowledge that the cloud server has received the first signaling. A process of sending the first response is added in this embodiment of the present disclosure, thereby improving implementability and integrity of this embodiment of the present disclosure.

In one embodiment, in a third implementation of the fifth aspect of the embodiments of the present disclosure, the cloud server further includes: a second receiving unit, configured to receive a second response sent by the calling access network element, where the second response is used to determine that the second signaling has been performed by the calling access network element. A process of receiving the second response is added in this embodiment of the present disclosure, thereby improving implementability and integrity of this embodiment of the present disclosure.

In one embodiment, in a fourth implementation of the fifth aspect of the embodiments of the present disclosure, the cloud server further includes: a third receiving unit, configured to receive a third response sent by the called access network element, where the third response is used to determine that the third signaling has been performed by the called access network element. A process of receiving the third response is added in this embodiment of the present disclosure, thereby improving implementability and integrity of this embodiment of the present disclosure.

In one embodiment, in a fifth implementation of the fifth aspect of the embodiments of the present disclosure, the cloud server further includes: a creation unit, configured to create target session management and target media management based on the first signaling. A process of creating, by the cloud server, session management and media management based on the first signaling is added in this embodiment of the present disclosure, so that this embodiment of the present disclosure is more logical.

In one embodiment, in a sixth implementation of the fifth aspect of the embodiments of the present disclosure, the cloud server further includes: a releasing unit, configured to release the target session management and the target media management when a voice call ends. A process of releasing, by the cloud server, computing resources when a session ends is added in this embodiment of the present disclosure, thereby improving operations of the embodiments of the present disclosure.

A sixth aspect of the embodiments of the present disclosure provides a called access network element, including: a receiving unit, configured to receive third signaling sent by a cloud server, where the third signaling is used to establish a second transmission path between the called access network element and the cloud server, and the second transmission path is used to transmit data between the called access network element and the cloud server; and an establishment unit, configured to establish the second transmission path based on the third signaling. In this embodiment of the present disclosure, a dynamic service capability is provided for voice over Internet protocol by using resources of a cloud server, thereby simplifying a processing capability of an access network element and lowering construction costs.

In one embodiment, in a first implementation of the sixth aspect of the embodiments of the present disclosure, the called access network element further includes: a sending unit, configured to send a third response to the cloud server, where the third response is used to determine that the third signaling has been performed by the called access network element. A process of sending the third response is added in this embodiment of the present disclosure, thereby improving implementability and integrity of this embodiment of the present disclosure.

According to a seventh aspect of the embodiments of the present disclosure, a computer-readable storage medium including an instruction is provided, when run on a computer, the instruction causing the computer to perform the method according to any one of the foregoing aspects.

According to an eighth aspect of the embodiments of the present disclosure, a computer program product including an instruction is provided, when run on a computer, the instruction causing the computer to perform the method according to any one of the foregoing aspects.

In the technical solutions provided by the embodiments of the present disclosure, after detecting the off-hook of the first phone set, the calling access network element encapsulates the off-hook event into the first signaling, and then, sends the first signaling to the cloud server, where the first signaling is used to create the session management and the media management by the cloud server; and the calling access network element receives the second signaling sent by the cloud server, and establishes the first transmission path based on the second signaling, where the second signaling is used to establish the first transmission path between the calling access network element and the cloud server, and the first transmission path is used to transmit data between the calling access network element and the cloud server. In the embodiments of the present disclosure, a dynamic service capability is provided for voice over Internet protocol by using resources of a cloud server, thereby optimizing configuration of network resources, improving overall efficiency of a network system, simplifying a processing capability of an access network element, and lowering construction costs.

DESCRIPTION OF EMBODIMENTS

Embodiments of the present disclosure provide a voice over Internet protocol processing method, for improving network efficiency of a voice over Internet protocol system and lowering construction costs.

To make persons skilled in the art understand solutions in the present disclosure better, the following describes the embodiments of the present disclosure with reference to the accompanying drawings in the embodiments of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units expressly listed, but may include other operations or units not expressly listed or fixed to such a process, method, system, product, or device.

Figure 1:
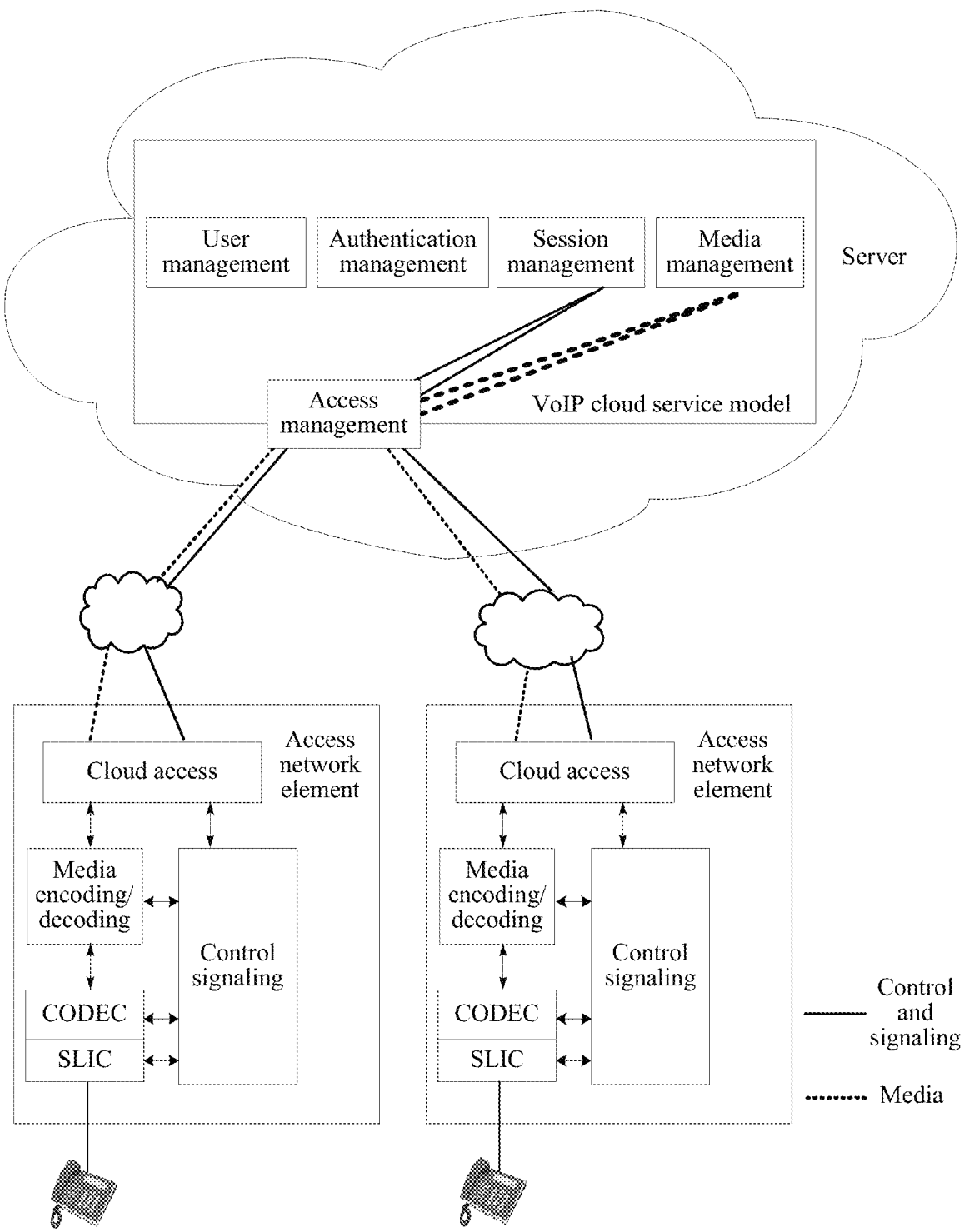
FIG. 1 is a schematic diagram of a system architecture according to an embodiment of the present disclosure.

The embodiments of the present disclosure may be applied to a network architecture shown in FIG. 1. In the network architecture, a phone set is connected to a cloud server through an access network element, and some computing functions of the access network element are transferred to the cloud server, for processing a voice call between phone sets.

Figure 2:
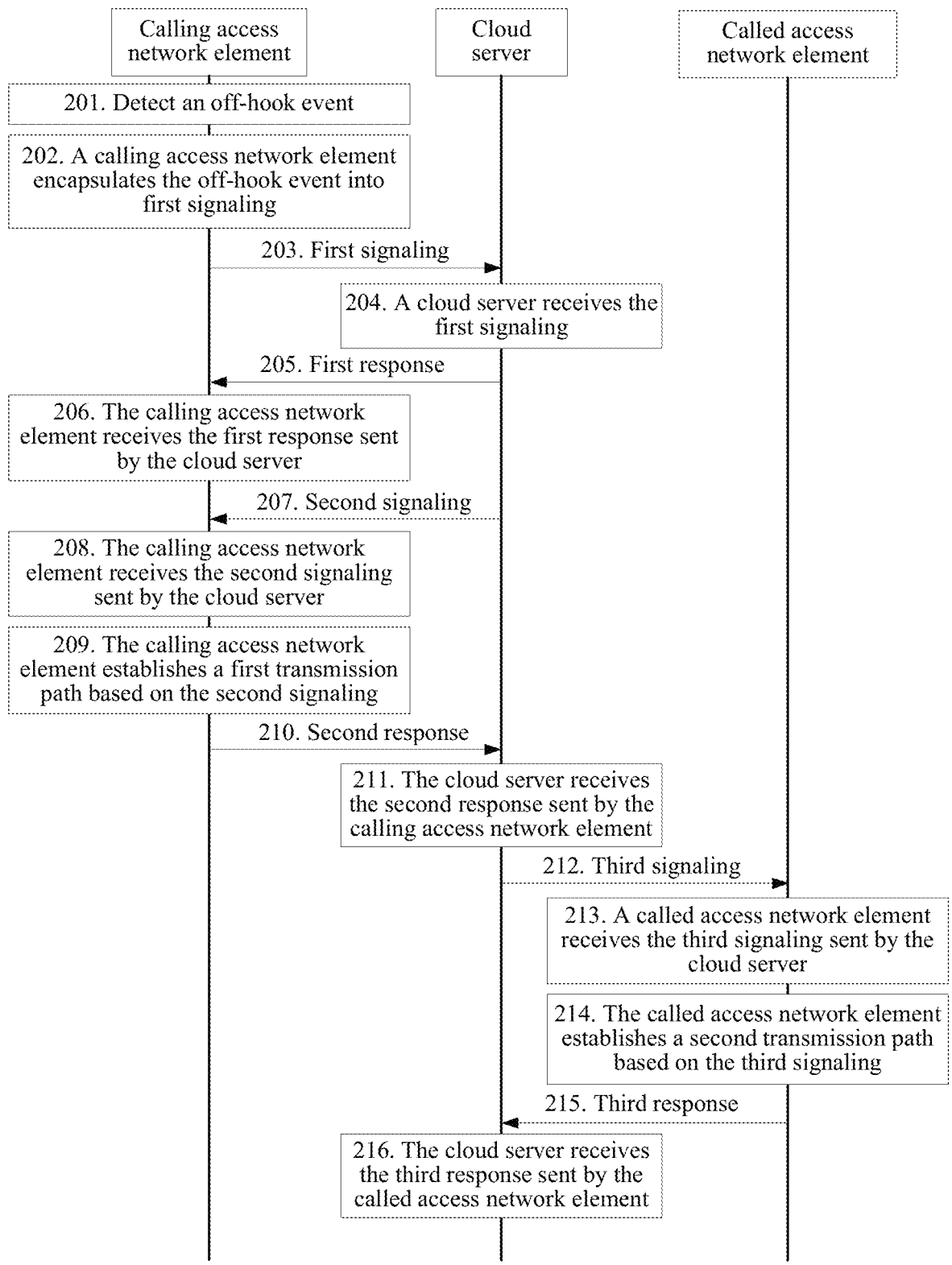
FIG. 2 is a schematic diagram of an embodiment of a voice over Internet protocol processing method according to an embodiment of the present disclosure.

For ease of understanding, specific procedures of the embodiments of the present disclosure are described below. Referring to FIG. 2, in the embodiments of the present disclosure, an embodiment of the voice over Internet protocol processing method includes the following operations.

Operation 201. A calling access network element detects an off-hook event, where the off-hook event is off-hook of a first phone set.

The calling access network element detects off-hook through a subscriber line interface circuit (SLIC) module. Before detecting the off-hook event, when a device system starts, the calling access network element initiates authentication. The calling access network element obtains first user information of the first phone set. The first user information includes IP address information of the first phone set. The calling access network element sends an authentication request to the cloud server. The authentication request carries the first user information. The cloud server receives the authentication request through an access management module, and after completing authentication by using an authentication management module in response to the authentication request, the cloud server determines that the calling access network element is a valid access network element. The cloud server sends an authentication acknowledgment to the calling access network element. After receiving the authentication acknowledgment sent by the cloud server, the calling access network element confirms validity of access by the first phone set.

It may be understood that, during an authentication process, the authentication management module of the cloud server calls pre-stored user data of the calling access network element from a user management module of the cloud server, where the user data includes dynamic data and static configuration of a user, the dynamic data includes IP address information, and the static configuration includes a service right and service data. The calling access network element and the called access network element both need to determine validity of an access device through authentication.

It should be noted that if authentication on the first phone set fails, the cloud server sends an authentication failure response to the calling access network element, and the calling access network element sends a prompt to the first phone set based on the authentication failure response. The prompt may include a preset voice prompt, or a preset text prompt, and may alternatively include a prompt in another form. This is not specifically limited herein.

Operation 202. The calling access network element encapsulates the off-hook event into first signaling.

After the calling access network element detects the off-hook event of the first phone set, the calling access network element encapsulates the off-hook event into the first signaling by using a signaling control module. The first signaling carries the off-hook event of the first phone set, and the first signaling may further include information such as hook detection, ring control, a hookflash, a pulse number, power-off, and polarity, and may be selected based on an actual condition. This is not specifically limited herein.

It should be noted that the signaling control module is responsible for executing all control commands, detecting and reporting a device signal or an event, and maintaining proper state management.

Operation 203. The calling access network element sends the first signaling to a cloud server.

The calling access network element sends the encapsulated first signaling to the cloud server through a cloud access module.

It should be noted that the cloud access module is responsible for connecting the access network element to the cloud server, and main functions include: sending and receiving authentication information and sending and receiving a packet. It may be understood that a secure transmission function may be included in the future.

Operation 204. The cloud server receives the first signaling.

The cloud server receives, through the access management module, the first signaling sent by the calling access network element, and forwards the received first signaling to a session management module for processing. The session management module creates first session management based on the first signaling. The first session management is responsible for a call between at least two users. A session has at least two users, or more than two users may perform a session simultaneously. This can be controlled based on an actual condition. This is not specifically limited herein.

It may be understood that when a voice call ends, the first session management created by the cloud server is released, and cloud server resources occupied by the first session management are released. The released cloud server resources may provide a network service for other session management, thereby improving network efficiency of the voice over Internet protocol.

Operation 205. The cloud server sends a first response to the calling access network element.

After the cloud server receives the first signaling by using the access management module, the cloud server sends a first response to the calling access network element through the access management module. The first response is used to acknowledge that the cloud server has received the first signaling.

It should be noted that in the embodiments of the present disclosure, the SIP protocol supported by the calling access network element may be the User Datagram Protocol (UDP). For example, in the UDP protocol, if a recipient successfully receives data, the recipient replies with an acknowledgment (ACK) message. Usually, an ACK message has its own fixed format and length. When a sender receives the ACK message that is fed back, the sender may send a next piece of data. When the sender has not received an ACK message that is fed back, the sender may have multiple choices based on different application scenarios: if the sender determines by default that the recipient has not received the data, the sender may re-send the current data to the recipient until receiving an ACK message that is fed back; and if the sender determines by default that the recipient has received the data, the sender stops sending the current data. A format of an ACK message depends on a used network protocol.

It may be understood that only after receiving the ACK message fed back by the cloud server, the calling access network element performs a next operation.

Operation 206. The calling access network element receives the first response sent by the cloud server.

The calling access network element receives, through the cloud access module, the first response sent by the cloud server. The first response is used to determine that the cloud server has received the first signaling.

Operation 207. The cloud server sends second signaling to the calling access network element, where the second signaling is used to establish a first transmission path between the calling access network element and the cloud server, and the first transmission path is used to transmit data between the calling access network element and the cloud server.

The cloud server sends the second signaling to the calling access network element through the access management module. The second signaling is used to establish the first transmission path between the calling access network element and the cloud server. The first transmission path is used to transmit data between the calling access network element and the cloud server. The second signaling includes a connect command, a used encoding/decoding form, a sampling rate, and a packet time.

It should be noted that the connect command may be divided into a command form recognizable to a media encoding/decoding module. In this embodiment of the present disclosure, a used encoding/decoding form is PCMA (G.711A) encoding/decoding, a used sampling rate is 16 K, and a packet time is 5 ms.

It may be understood that, in this embodiment of the present disclosure, encoding/decoding in another form, such as PCMU (G.711U) encoding/decoding, may alternatively be used. The packet time and the sampling rate may both be set based on an actual condition. For example, the sampling rate is 8 K. This is not specifically limited herein.

Operation 208. The calling access network element receives the second signaling sent by the cloud server.

The calling access network element receives, through the cloud access module, the second signaling sent by the cloud server.

Operation 209. The calling access network element establishes a first transmission path based on the second signaling, where the first transmission path is used to transmit data between the calling access network element and the cloud server.

The calling access network element establishes the first transmission path based on the second signaling, where the first transmission path is used to transmit data between the calling access network element and the cloud server. The calling access network element encapsulates, through the media encoding/decoding module at a specific sampling rate and a needed frame size, a PCM bitstream output by a codec, adds control information to the PCM bitstream, and transmits the PCM bitstream by using the real-time transport protocol (RTP) or real-time transport control protocol (RTCP). The media encoding/decoding module further needs to have jitter buffer (JB) and packet loss compensation (PLC) functions, for processing network jitters, missequencing, and a packet loss within a specific range. The cloud server processes, through a media management module, the PCM bitstream sent by the calling access network element, and needs to perform proper media algorithm processing based on characteristics of different services.

For a common session, that is, simple one-to-one communication, only echo cancellation (EC) algorithm processing needs to be performed on the PCM bitstream, thereby greatly reducing an impact of echoes on voice quality and user perception.

For a multi-party session, for example, a three-party call or conference, in addition to performing EC algorithm processing on the PCM bitstream, the cloud server further needs to perform audio mixing processing. The audio mixing processing includes audio mixing of a plurality of users, audio mixing of a conference call, and insertion of a signal tone. All algorithms related to processing of a media stream between users are completed by the cloud server. The insertion of a signal tone includes data transmission functions such as frequency shift keying (FSK) and dual tone multiple frequency DTMF), and is mainly used as functions such as calling line identification presentation and a message waiting indicator.

The cloud server may perform signal tone detection and voice optimization algorithm processing on the PCM bitstream, for example, detection of a DTMF, FSK, or FAX/MODEM signal tone; and optimize user perception by using an algorithm based on characteristics of VoIP voice, thereby reducing voice quality degradation caused by factors such as network jitters, a delay, and a packet loss, and improving user experience. In addition, a FAX service is recognized based on a distinctive signal tone transmitted on a voice channel, where the distinctive signal tone includes a plurality of signals such as a called terminal identification (CED) signal and an answer mode (AnsMode, ANS) signal. Signal tone detection is used as a core, and an algorithm of voice processing is properly adjusted. For example, an EC algorithm is removed in a high-speed FAX service, and the EC algorithm is used in some low-speed FAX services. A Modem service is similar to the FAX service, and their characteristics and processing manners are similar. This is not specifically limited herein.

It should be noted that DTMF detection is a basic function, and also relates to a process similar to signal detection. For example, for a voice session, EC algorithm processing needs to be performed. For a FAX/MODEM session, a signal in the session needs to be detected, to use a proper media processing policy, for example, a known EC control policy or a voice algorithm that reduces a loss in original media. Alternatively, functions, such as directly converting a fax into a email and sending the email to a user, and collecting, for dialing of a user, a DTMF signal tone in the dialing, may be implemented.

It may be understood that the first transmission path connects a CODEC/SLIC module to the media encoding/decoding module and the cloud access module. The CODEC/SLIC module is connected to the first phone set, so that voice data and a relevant control signal may be transmitted between the first phone set and the cloud server through the calling access network element.

Operation 210. The calling access network element sends a second response to the cloud server, where the second response is used to determine that the second signaling has been performed by the calling access network element.

After receiving the second signaling and executing the second signaling, the calling access network element sends the second response to the cloud server. The second response is used to determine that the second signaling has been performed by the calling access network element.

Operation 211. The cloud server receives the second response sent by the calling access network element, where the second response is used to determine that the second signaling has been performed.

The cloud server receives, through the access management module, the second response sent by the calling access network element. The second response is used to determine that the second signaling has been performed.

It should be noted that after the cloud server receives the second response, the first transmission path between the cloud server and the calling access network element is formally established, and any voice on the first phone set is processed based on a specific encoding/decoding type (for example, PCMA) and a packet time and sent to the cloud server through the first transmission path. If the cloud server needs to play a voice by using the first phone set, the cloud server can process a voice message based on a specific encoding/decoding type and send the processed voice message to the calling access network element.

It may be understood that, after the first transmission path is established and a voice session is generated, the cloud server creates a media management module instance for the corresponding voice session, that is, creates an independent media management module ensuring service quality for a user in the session. The media management module may be understood as an independent computing resource on the cloud server. When the session ends, the corresponding media management module instance is also released, so that the occupied resource on the cloud server is also released. The cloud server plays a dial tone for the first phone set through the first transmission path. The first phone set inputs a number "X" based on input of the user. After detecting the number "X" on the first transmission path, the cloud server stops playing the dial tone and continues to receive a number. The first phone set continues to input a number "Y", and after detecting the number "Y" on the first transmission path, the cloud server continues to receive a number, and the first phone set continues to input a number until a last number "Z" is input. After detecting a number on a voice channel, the cloud server completes number matching and initiates, based on a received target number string "XY . . . Z", an action of paging a called party. For example, a specific target number string may be "13100001111" or another number string. This is not specifically limited herein. A subsequent paging manner is the same as an existing paging manner.

Details are not described herein.

Operation 212. The cloud server sends third signaling to the called access network element, where the third signaling is used to establish a second transmission path between the called access network element and the cloud server, and the second transmission path is used to transmit data between the called access network element and the cloud server.

The cloud server determines a called second phone set based on the received target number string. An access network element connected to the second phone set is the called access network element. The cloud server sends the third signaling to the called access network element. The third signaling is used to establish the second transmission path between the called access network element and the cloud server. The second transmission path is used to transmit data between the called access network element and the cloud server. The third signaling includes a connect connect command, a used encoding/decoding form, a sampling rate, and a packet time.

It should be noted that the called access network element and the calling access network element both need to confirm validity of an access device through authentication. Before the cloud server sends the third signaling to the called access network element, when a device system starts, the called access network element initiates authentication. The called access network element obtains second user information of the second phone set. The second user information includes IP address information of the second phone set. The called access network element sends an authentication request to the cloud server. The authentication request carries the second user information. The cloud server receives the authentication request through the access management module, and after completing authentication by using the authentication management module in response to the authentication request, the cloud server determines that the called access network element is a valid access network element. The cloud server sends an authentication acknowledgment to the called access network element. After receiving the authentication acknowledgment sent by the cloud server, the called access network element confirms validity of access by the second phone set.

It may be understood that the connect command may be divided into a command form recognizable to a media encoding/decoding module. In this embodiment of the present disclosure, a used encoding/decoding form is PCMA (G.711A) encoding/decoding, a used sampling rate is 16 K, and a packet time is 5 ms. In this embodiment of the present disclosure, another encoding/decoding form such as PCMU (G.711U) encoding/decoding, may alternatively be used. The packet time and the sampling rate may both be set based on an actual condition. For example, the sampling rate is 8 K. This is not specifically limited herein. The cloud server determines that all of the encoding/decoding form, the sampling rate, and the packet time of the calling access network element are the same as those of the called access network element.

Operation 213. The called access network element receives the third signaling sent by the cloud server.

The called access network element receives, through the cloud access module, the third signaling sent by the cloud server.

Operation 214. The called access network element establishes a second transmission path based on the third signaling, where the second transmission path is used to transmit data between the called access network element and the cloud server.

The called access network element establishes the second transmission path based on the third signaling, where the second transmission path is used to transmit data between the called access network element and the cloud server. The called access network element receives, based on the RTP/RTCP, a PCM bitstream sent by the cloud server, and decapsulates the received PCM bitstream through a media encoding/decoding module at a specific sampling rate and a needed frame size. The media encoding/decoding module further needs to have JB and PLC functions, for processing network jitters, missequencing, and a packet loss within a specific range. The cloud server processes, through the media management module, the PCM bitstream received by the called access network element, and needs to perform proper media algorithm processing based on different service characteristics.

For a common session, that is, simple one-to-one communication, only EC algorithm processing needs to performed on the PCM bitstream, thereby greatly reducing an impact of echoes on voice quality and user perception.

For a multi-party session, for example, a three-party call or conference, in addition to performing EC algorithm processing on the PCM bitstream, the cloud server further needs to perform audio mixing processing. The audio mixing processing includes audio mixing of a plurality of users, audio mixing of a conference call, and insertion of a signal tone. All algorithms related to processing of a media stream between users are completed by the cloud server. The insertion of a signal tone includes data transmission functions such as FSK and DTMF, and is mainly used as functions such as calling line identification presentation and a message waiting indicator.

The cloud server may perform signal tone detection and voice optimization algorithm processing on the PCM bitstream, for example, detection of a DTMF, FSK, or FAX/MODEM signal tone; and optimize user perception by using an algorithm based on characteristics of VoIP voice, thereby reducing voice quality degradation caused by factors such as network jitters, a delay, and a packet loss, and improving user experience. In addition, a FAX service is recognized based on a distinctive signal tone transmitted on a voice channel, where the distinctive signal tone includes a plurality of signals such as a CED signal and an ANS signal. Signal tone detection is used as a core, and an algorithm of voice processing is properly adjusted. For example, the EC algorithm is removed in a high-speed FAX service, and the EC algorithm is used in some low-speed FAX services. A Modem service is similar to the FAX service, and their characteristics and processing manners are similar. This is not specifically limited herein.

It should be noted that DTMF detection is a basic function, and also relates to a process similar to signal detection. For example, for a voice session, EC algorithm processing needs to be performed. For a FAX/MODEM session, a signal in the session needs to be detected, to use a proper media processing policy, for example, a known EC control policy or a voice algorithm that reduces a loss in original media. Alternatively, functions, such as directly converting a fax into a email and sending the email to a user, and collecting, for dialing of a user, a DTMF signal tone in the dialing, may be implemented.

It may be understood that the second transmission path connects a CODEC/SLIC module to the media encoding/decoding module and the cloud access module. The CODEC/SLIC module is connected to the second phone set, so that voice data and a relevant control signal may be transmitted between the second phone set and the cloud server through the called access network element.

It should be noted that the called access network element and the calling access network element may be a same access network element or two different access network elements. When the called access network element and the calling access network element are a same access network element, both of the first phone set and the second phone set are located in the same access network element. When the called access network element and the calling access network element are two different access network elements, the first phone set and the second phone set are respectively located in the calling access network element and the called access network element.

Operation 215. The called access network element sends a third response to the cloud server, where the third response is used to determine that the third signaling has been performed.

The called access network element sends the third response to the cloud server through the cloud access module, where the third response is used to determine that the third signaling has been performed.

Operation 216. The cloud server receives the third response sent by the called access network element, where the third response is used to determine that the third signaling has been performed.

The cloud server receives the third response sent by the called access network element, where the third response is used to determine that the third signaling has been performed.

It should be noted that after the cloud server receives the third response sent by the called access network element, the second transmission path is formally established, and any voice on the second phone set is sent to the cloud server through the second transmission path by using a specific encoding/decoding type (PCMA in this embodiment of the present disclosure) and a packet time. The second phone set starts to ring, and the cloud server needs the first phone set to hear a ringback tone, and sends a voice packet to the calling access network element by using specific encoding/decoding. After off-hook of the second phone set, the cloud server stops playing the ringback tone, and starts to forward media packets between a calling user and a called user. At this point, the calling user and the called user formally start a call.

In this embodiment of the present disclosure, a dynamic service capability is provided for voice over Internet protocol by using resources of a cloud server, thereby optimizing configuration of network resources, improving overall efficiency of a network system, simplifying a processing capability of an access network element, and lowering construction costs.

Figure 3:
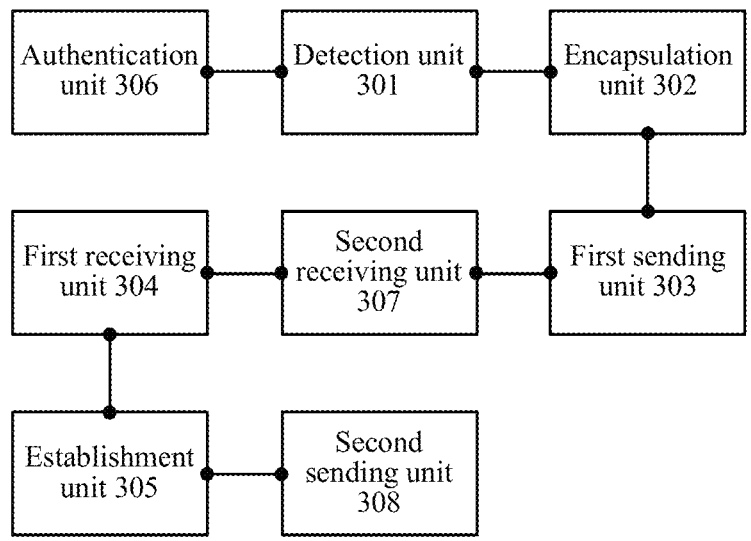
FIG. 3 is a schematic diagram of an embodiment of a calling access network element according to an embodiment of the present disclosure.

The voice over Internet protocol processing method in the embodiments of the present disclosure is described above, and an access network element and a cloud server in the embodiments of the present disclosure are described below. Referring to FIG. 3, an embodiment of a calling access network element in this embodiment of the present disclosure includes:

a detection unit 301, configured to detect an off-hook event, where the off-hook event is off-hook of a first phone set, and the first phone set is connected to the calling access network element;

an encapsulation unit 302, configured to encapsulate the off-hook event into first signaling;

a first sending unit 303, configured to send the first signaling to a cloud server, where the first signaling is used to create session management and media management by the cloud server;

a first receiving unit 304, configured to receive second signaling sent by the cloud server, where the second signaling is used to establish a first transmission path between the calling access network element and the cloud server, and the first transmission path is used to transmit data between the calling access network element and the cloud server; and an establishment unit 305, configured to establish the first transmission path based on the second signaling.

In one embodiment, the calling access network element may further include:

an authentication unit 306, configured to: when a device system starts, initiate authentication to the cloud server.

In one embodiment, the calling access network element may further include:

a second receiving unit 307, configured to receive a first response sent by the cloud server, where the first response is used to acknowledge that the cloud server has received the first signaling.

In one embodiment, the calling access network element may further include:

a second sending unit 308, configured to send a second response to the cloud server, where the second response is used to determine that the second signaling has been performed by the calling access network element.

In this embodiment of the present disclosure, a dynamic service capability is provided for voice over Internet protocol by using resources of a cloud server, thereby simplifying a processing capability of an access network element and lowering construction costs.

Figure 4:
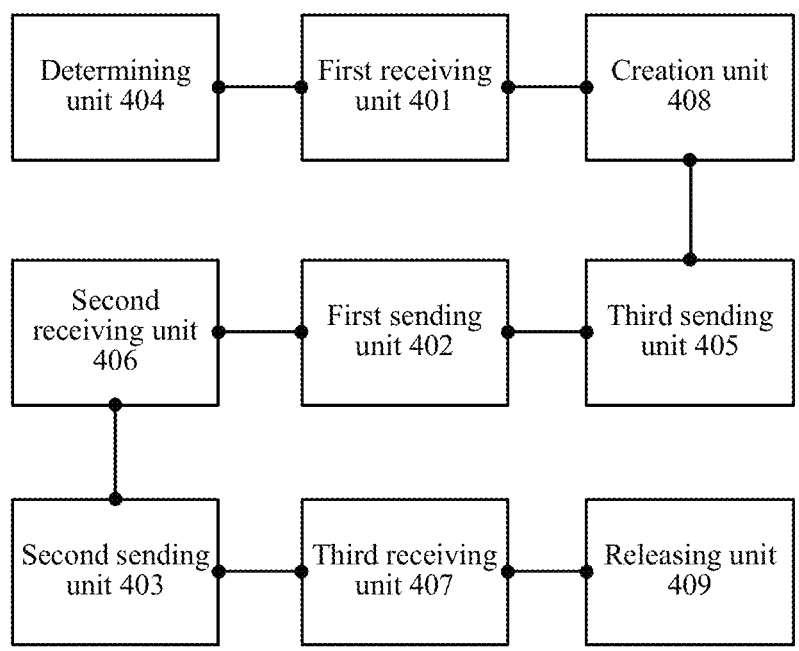
FIG. 4 is a schematic diagram of an embodiment of a cloud server according to an embodiment of the present disclosure.

Referring to FIG. 4, an embodiment of a cloud server in this embodiment of the present disclosure includes:

a first receiving unit 401, configured to receive first signaling sent by a calling access network element, where the first signaling carries an off-hook event, and the off-hook event is off-hook of a first phone set;

a first sending unit 402, configured to send second signaling to the calling access network element, where the second signaling is used to establish a first transmission path between the calling access network element and the cloud server, and the first transmission path is used to transmit data between the calling access network element and the cloud server; and a second sending unit 403, configured to send third signaling to a called access network element, where the third signaling is used to establish a second transmission path between the called access network element and the cloud server, and the second transmission path is used to transmit data between the called access network element and the cloud server.

In one embodiment, the cloud server may further include:

a determining unit 404, configured to determine that the calling access network element has been authenticated.

In one embodiment, the cloud server may further include:

a third sending unit 405, configured to send a first response to the calling access network element, where the first response is used to acknowledge that the cloud server has received the first signaling.

In one embodiment, the cloud server may further include:

a second receiving unit 406, configured to receive a second response sent by the calling access network element, where the second response is used to determine that the second signaling has been performed by the calling access network element.

In one embodiment, the cloud server may further include:

a third receiving unit 407, configured to receive a third response sent by the called access network element, where the third response is used to determine that the third signaling has been performed by the called access network element.

In one embodiment, the cloud server may further include:

a creation unit 408, configured to create target session management and target media management based on the first signaling.

In one embodiment, the cloud server may further include:

a releasing unit 409, configured to release the target session management and the target media management when a voice call ends.

In this embodiment of the present disclosure, a dynamic service capability is provided for voice over Internet protocol by using resources of a cloud server, thereby optimizing configuration of network resources and improving overall efficiency of a network system.

Figure 5:
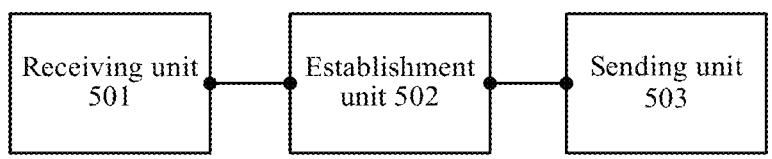
FIG. 5 is a schematic diagram of an embodiment of a called access network element according to an embodiment of the present disclosure.

Referring to FIG. 5, an embodiment of a called access network element in this embodiment of the present disclosure includes:

a receiving unit 501, configured to receive third signaling sent by a cloud server, where the third signaling is used to establish a second transmission path between the called access network element and the cloud server, and the second transmission path is used to transmit data between the called access network element and the cloud server; and an establishment unit 502, configured to establish the second transmission path based on the third signaling.

In one embodiment, the called access network element may further include:

a sending unit 503, configured to send a third response to the cloud server, where the third response is used to determine that the third signaling has been performed by the called access network element.

In this embodiment of the present disclosure, a dynamic service capability is provided for voice over Internet protocol by using resources of a cloud server, thereby simplifying a processing capability of an access network element and lowering construction costs.

FIG. 3 to FIG. 5 above respectively describe in detail the calling access network element, the cloud server, the called access network element in the embodiments of the present disclosure from the perspective of a modularized functional entity, and the access network element and the cloud server in the embodiments of the present disclosure are described below in detail from the perspective of hardware processing.

Figure 6:
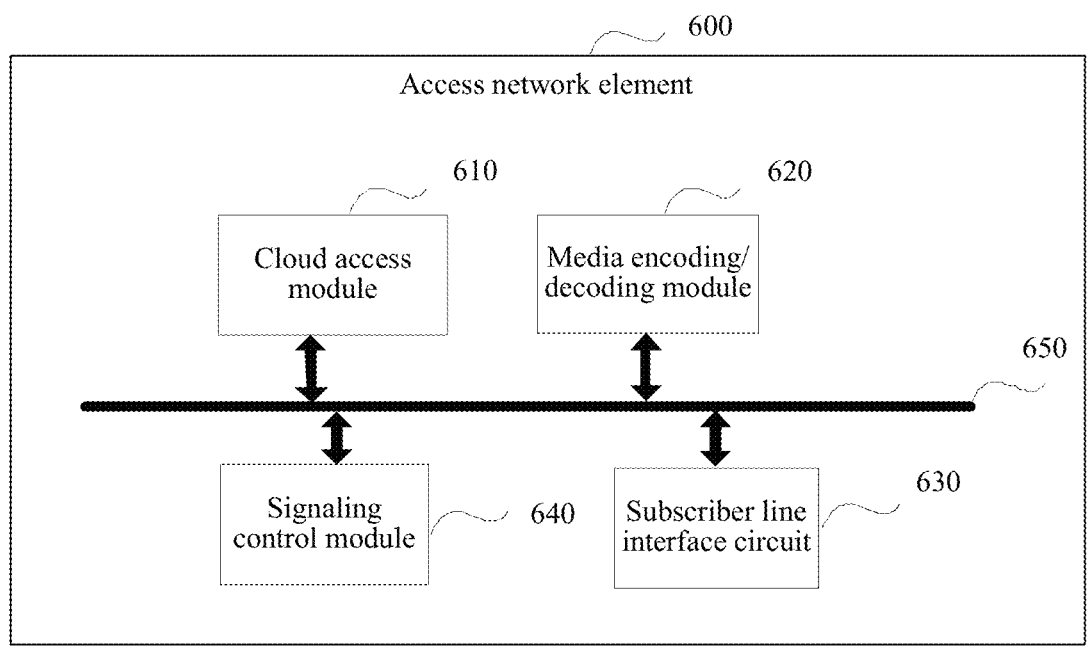
FIG. 6 is a schematic diagram of an embodiment of an access network element according to an embodiment of the present disclosure.

FIG. 6 is a schematic structural block diagram of an access network element according to an embodiment of the present disclosure.

When an integrated unit is used, FIG. 6 shows a possible schematic structural diagram of the access network element included in the foregoing embodiments. Persons skilled in the art may understand that the structure of the access network element shown in FIG. 6 does not constitute a limitation to the access network element, and the access network element may include more or fewer components than those shown in the figure, or some components may be combined, or a different component deployment may be used.

The following specifically describes the components of the access network element with reference to FIG. 6.

An access network element 600 includes: a cloud access module 610, a media encoding/decoding module 620, a subscriber line interface circuit module 630, a signaling control module 640, and a bus 650.

The cloud access module 610, the media encoding/decoding module 620, the subscriber line interface circuit module 630, and the signaling control module 640 are connected through the bus 650.

The cloud access module 610 is configured for a connection between the access network element 600 and the cloud server.

The media encoding/decoding module 620 is configured for encoding/decoding processing.

The subscriber line interface circuit module 630 is configured to connect the access network element to a phone set.

The signaling control module 640 is configured to execute control signaling.

The bus 650 may be classified into an address bus, a data bus, a control bus, and the like. For ease of representation, only one thick line is used to represent the bus in FIG. 6, but this does not mean that there is only one bus or only one type of bus. The cloud access module 610, the media encoding/decoding module 620, the subscriber line interface circuit module 630, and the signaling control module 640 are connected through the bus 650 and perform relevant operations in the foregoing method embodiments.

Figure 7:
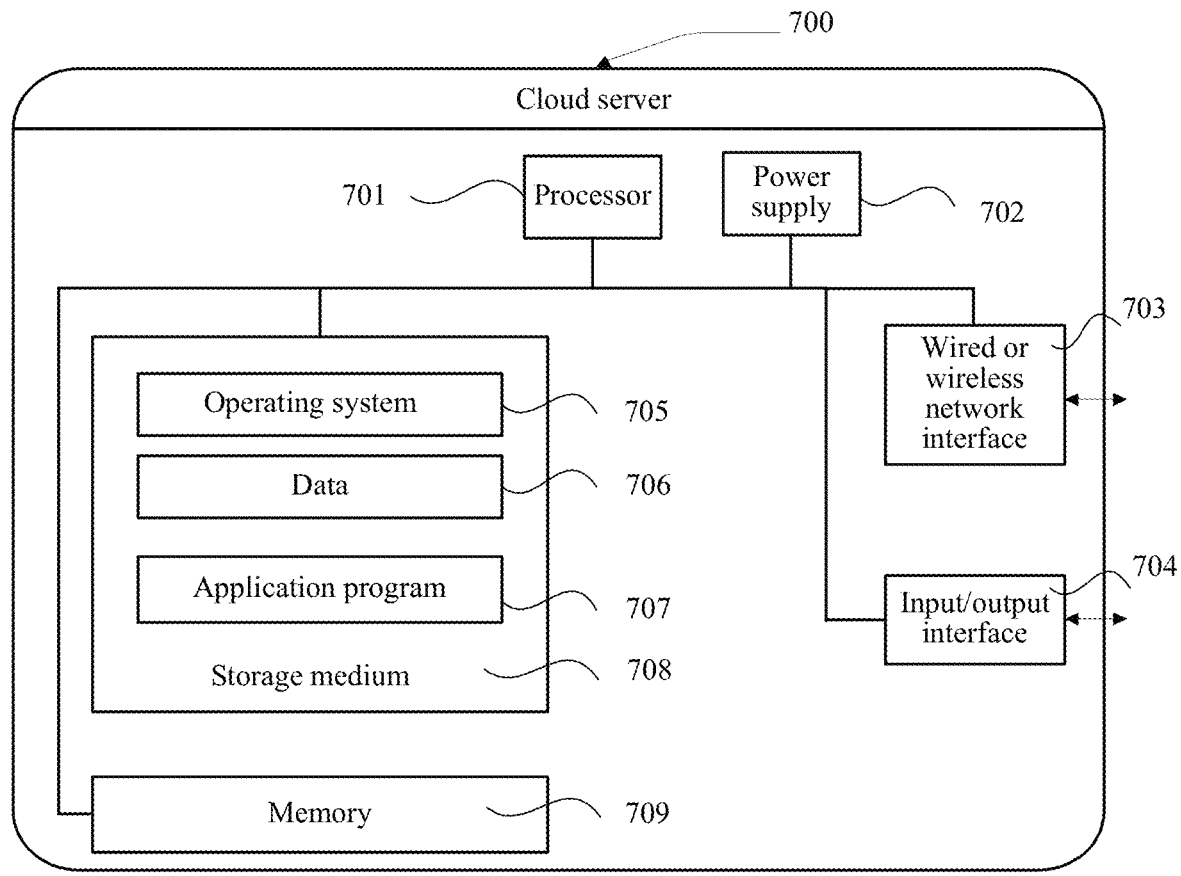
FIG. 7 is a schematic diagram of another embodiment of a cloud server according to an embodiment of the present disclosure.

FIG. 7 is a schematic structural block diagram of a cloud server according to an embodiment of the present disclosure. The cloud server 700 may vary greatly due to different configurations or performance, and may include one or more central processing units (CPU) 701 (for example, one or more processors) and a memory 709, and one or more storage media 708 (for example, one or more mass storage devices) that store an application program 707 or data 706. The memory 709 and the storage medium 708 may be transient storages or persistent storages. A program stored in the storage medium 708 may include one or more modules (not shown in the figure), and each module may include a series of instruction operations in a server. Furthermore, the processor 701 may be configured to: communicate with the storage medium 708, and perform, in the cloud server 700, a series of instruction operations in the storage medium 708.

The cloud server 700 may further include one or more power supplies 702, one or more wired or wireless network interfaces 703, one or more input/output interfaces 704, and/or one or more operating systems 705, for example, Windows Server, Mac OS X, Unix, Linux, or FreeBSD.

The operations performed by the cloud server in the foregoing embodiments may be based on the device structure of the cloud server shown in FIG. 7.

By calling operation instructions stored in the memory 709, the processor 701 is configured to generate, after a calling access network element receives a first response, generate second signaling that needs to be sent to the calling access network element; and generate, after receiving a second response, generate third signaling that needs to be sent to a called access network element.

In one embodiment, in some embodiments of the present disclosure, the processor 701 is further configured to perform operation 204 in FIG. 2. Details are not described herein again.

In one embodiment, in some embodiments of the present disclosure, the processor 701 is further configured to perform operation 211 in FIG. 2. Details are not described herein again.

In one embodiment, in some embodiments of the present disclosure, the processor 701 is further configured to perform operation 216 in FIG. 2. Details are not described herein again.

Methods or algorithm operations described in combination with the content disclosed in this embodiment of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (Erasable Programmable ROM, EPROM), an electrically erasable programmable read-only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an application-specific integrated circuit (ASIC). In addition, the ASIC may be located in the control plane network element or the user plane network element. Certainly, the processor and the storage medium may also exist in the control plane network element or the user plane network element as discrete components.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or a compact disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A voice over Internet protocol processing method, comprising:
   detecting, by a calling access network element, an off-hook event, wherein the off-hook event is off-hook of a first phone set, and the first phone set is connected to the calling access network element;
   encapsulating, by the calling access network element, the off-hook event into first signaling;
   sending, by the calling access network element, the first signaling to a cloud server, wherein the first signaling causes the cloud server to create therein a session management and a media management;
   receiving, by the calling access network element, second signaling sent by the cloud server, wherein the second signaling comprises a connect command, a used encoding/decoding form, a sampling rate, and a packet time, wherein the second signaling is used to establish a first transmission path between the calling access network element and the cloud server, and the first transmission path is used to transmit data between the calling access network element and the cloud server;
   establishing, by the calling access network element, the first transmission path based on the second signaling; and
   encapsulating, by the calling access network element, at the sampling rate and a required frame size, a pulse code modulated (PCM) bitstream output by a codec, adding control information to the PCM bitstream, and transmitting the PCM bitstream, with the added control information, through the first transmission path;
   wherein the cloud server performs signal tone insertion and detection on the PCM bitstream, and wherein the calling access network element does not perform the signal tone insertion or detection on the PCM bitstream.

2. The processing method according to claim 1, wherein before the detecting, by a calling access network element, an off-hook event, the processing method further comprises:
   when a device system starts, initiating, by the calling access network element, authentication to the cloud server.

3. The processing method according to claim 1, wherein after the sending, by the calling access network element, the first signaling to a cloud server, and before the receiving, by the calling access network element, second signaling sent by the cloud server, the processing method further comprises:
   receiving, by the calling access network element, a first response sent by the cloud server, wherein the first response is used to acknowledge that the cloud server has received the first signaling.

4. The processing method according to claim 1, wherein after the establishing, by the calling access network element, the first transmission path based on the second signaling, the processing method further comprises:
   sending, by the calling access network element, a second response to the cloud server, wherein the second response is used to determine that the second signaling has been performed by the calling access network element.

5. A voice over Internet protocol processing method, comprising:
   receiving, by a cloud server, first signaling sent by a calling access network element, wherein the first signaling carries an off-hook event that is an off-hook of a first phone set;
   creating, by the cloud server, a session management and a media management in response to receiving the first signaling;
   sending, by the cloud server, second signaling to the calling access network element, wherein the second signaling comprises a connect command, a used encoding/decoding form, a sampling rate, and a packet time, and is used to establish a first transmission path between the calling access network element and the cloud server, wherein the first transmission path is used to transmit data between the calling access network element and the cloud server;
   receiving, by the cloud server, at the sampling rate and a required frame size, an encapsulated pulse code modulated (PCM) bitstream output by a codec, with control information, through the first transmission path; and
   performing signal tone insertion and detection on the PCM bitstream, wherein the calling access network element does not perform the signal tone insertion or detection on the PCM bitstream.

6. The processing method according to claim 5, further comprising:
   receiving, by the cloud server, a number string corresponding to a second phone set and determining a called access network element to which the second phone set is connected; and
   sending, by the cloud server, third signaling to a called access network element, wherein the third signaling is used to establish a second transmission path between the called access network element and the cloud server, and the second transmission path is used to transmit data between the called access network element and the cloud server.

7. The processing method according to claim 5, wherein after the receiving, by a cloud server, first signaling sent by a calling access network element, and before the sending, by the cloud server, second signaling to the calling access network element, the processing method further comprises:
   sending, by the cloud server, a first response to the calling access network element, wherein the first response is used to acknowledge that the cloud server has received the first signaling.

8. The processing method according to claim 5, wherein after the sending, by the cloud server, second signaling to the calling access network element, and before the sending, by the cloud server, third signaling to a called access network element, the processing method further comprises:
   receiving, by the cloud server, a second response sent by the calling access network element, wherein the second response is used to determine that the second signaling has been performed by the calling access network element.

9. The processing method according to claim 5, wherein after the sending, by the cloud server, third signaling to a called access network element, the processing method further comprises:
   receiving, by the cloud server, a third response sent by the called access network element, wherein the third response is used to determine that the third signaling has been performed by the called access network element.

10. The processing method according to claim 5, wherein after the receiving, by a cloud server, first signaling sent by a calling access network element, and before the sending, by the cloud server, second signaling to the calling access network element, the processing method further comprises:
    creating, by the cloud server, target session management and target media management based on the first signaling.

11. A calling access network element, comprising:
    a detection unit, configured to detect an off-hook event, wherein the off-hook event is off-hook of a first phone set, and the first phone set is connected to the calling access network element;
    an encapsulation unit, configured to encapsulate the off-hook event into first signaling;
    a first sending unit, configured to send the first signaling to a cloud server, wherein the first signaling causes the cloud server to create therein a session management and a media management;
    a first receiving unit, configured to receive second signaling sent by the cloud server, wherein the second signaling comprises a connect command, a used encoding/decoding form, a sampling rate, and a packet time and is used to establish a first transmission path between the calling access network element and the cloud server, wherein the first transmission path is used to transmit data between the calling access network element and the cloud server; and
    an establishment unit, configured to establish the first transmission path based on the second signaling;
    wherein the calling access network element is further configured to:
    encapsulate at the sampling rate and a required frame size, a pulse code modulated (PCM) bitstream output by a codec, add control information to the PCM bitstream, and transmit the PCM bitstream, with the added control information, through the first transmission path;
    wherein the cloud server performs signal tone insertion and detection on the PCM bitstream, and wherein the calling access network element does not perform the signal tone insertion or detection on the PCM bitstream.

12. The calling access network element according to claim 11, further comprising:
an authentication unit, configured to: when a device system starts, initiate authentication to the cloud server.

13. The calling access network element according to claim 11, further comprising:
a second receiving unit, configured to receive a first response sent by the cloud server, wherein the first response is used to acknowledge that the cloud server has received the first signaling.

14. The calling access network element according to claim 11, further comprising:
a second sending unit, configured to send a second response to the cloud server, wherein the second response is used to determine that the second signaling has been performed by the calling access network element.

15. A cloud server, comprising:
a first receiving unit, configured to receive first signaling sent by a calling access network element, wherein the first signaling carries an off-hook event, and the off-hook event is off-hook of a first phone set;
a creation unit configured to create a session management and a media management in response to receiving the first signaling; and
a first sending unit, configured to send second signaling to the calling access network element, wherein the second signaling comprises a connect command, a used encoding/decoding form, a sampling rate, and a packet size and is used to establish a first transmission path between the calling access network element and the cloud server, wherein the first transmission path is used to transmit data between the calling access network element and the cloud server;
wherein the cloud server is configured to:
receive at the sampling rate and a required frame size, an encapsulated pulse code modulated (PCM) bitstream output by a codec, with control information, through the first transmission path, and
perform signal tone insertion and detection on the PCM bitstream, wherein the calling access network element does not perform the signal tone insertion or detection on the PCM bitstream.

16. The cloud server according to claim 15, further comprising:
a second sending unit configured to:
receive a number string corresponding to a second phone set and determine a called access network element to which the second phone set is connected, and
send third signaling to a called access network element, wherein the third signaling is used to establish a second transmission path between the called access network element and the cloud server, and the second transmission path is used to transmit data between the called access network element and the cloud server.

17. The cloud server according to claim 15, further comprising:
a third sending unit, configured to send a first response to the calling access network element, wherein the first response is used to acknowledge that the cloud server has received the first signaling.

18. The cloud server according to claim 15, further comprising:
a second receiving unit, configured to receive a second response sent by the calling access network element, wherein the second response is used to determine that the second signaling has been performed by the calling access network element.

19. A called access network element, comprising:
a receiving unit, configured to receive third signaling sent by a cloud server, wherein the third signaling comprises a connect command, a used encoding/decoding form, a sampling rate, and a packet time and is used to establish a second transmission path between the called access network element and the cloud server, wherein the second transmission path is used to transmit data between the called access network element and the cloud server; and
an establishment unit, configured to establish the second transmission path based on the third signaling;
wherein the called access network element is further configured to:
encapsulate at the sampling rate and a required frame size, a pulse code modulated (PCM) bitstream output by a codec, add control information to the PCM bitstream, and transmit the PCM bitstream through the second transmission path;
wherein the cloud server performs signal tone insertion and detection on the PCM bitstream, and wherein the called access network element does not perform the signal tone insertion or detection on the PCM bitstream.

20. The called access network element according to claim 19, further comprising:
a sending unit, configured to send a third response to the cloud server, wherein the third response is used to determine that the third signaling has been performed by the called access network element.

\* \* \* \* \*